United States Patent [19]

Pieroni

[11] Patent Number: 5,288,061
[45] Date of Patent: Feb. 22, 1994

[54] PIN FOR USE IN FABRIC STACKING AND PINNING TABLE

[75] Inventor: Robert J. Pieroni, Youngstown, N.Y.

[73] Assignee: Eastman Machine Company, Buffalo, N.Y.

[21] Appl. No.: 843,615

[22] Filed: Feb. 28, 1992

[51] Int. Cl.$^5$ ............................................. B23Q 1/00
[52] U.S. Cl. ................................. 269/4.5; 269/54.1; 269/53; 269/50
[58] Field of Search ................................. 269/50–54, 269/54.1, 54.2, 54.3, 54.4, 54.5, 286, 289 R

[56] References Cited

U.S. PATENT DOCUMENTS

| | | | |
|---|---|---|---|
| 1,250,453 | 12/1917 | Hayes | 269/53 |
| 2,243,668 | 5/1941 | Cash | 269/54.5 |
| 3,583,556 | 6/1971 | Wagner | 269/286 |
| 4,303,233 | 12/1981 | Meyer, III | 269/54.5 |
| 4,832,323 | 5/1989 | Principe et al. | 269/54.5 |
| 5,063,800 | 11/1991 | Jung et al. | 269/54.5 |
| 5,090,669 | 2/1992 | Pieroni | 269/54.5 |

Primary Examiner—Bruce M. Kisliuk
Assistant Examiner—Eileen P. Morga
Attorney, Agent, or Firm—Hodgson, Russ, Andrews, Woods & Goodyear

[57] ABSTRACT

A pin for use in apparatus for supporting sheet material such as cloth during operations such as cutting performed thereon comprising a supporting frame, a planar supporting surface on the frame for receiving plies of sheet material placed thereon, the surface having at least one through aperture therein and the surface having an outer portion contacting the material and an oppositely disposed portion, a pin holding and supporting arrangement carried by the frame and facing the oppositely disposed portion of the supporting surface, the holding and supporting surface for receiving a pin and maintaining the disposition of the pin substantially perpendicular to the plane of the surface and the location of the pin in registry with the aperture, a mechanism carried by the frame for moving the holding and supporting arrangement to move the pin through the aperture so that sheet material can be anchored on the pin, the pin comprising an elongated body having a substantially constant cross sectional dimension along substantially the entire length of the body and terminating in a sharp pointed head at one end of the body and an enlargement at the opposite end of the body having a shape and cross-sectional size enabling the holding and supporting arrangement to positively hold the pin and prevent unwanted withdrawl of the pin while at the same time allowing unimpeded movement of the pin and the enlargement through the aperture.

17 Claims, 2 Drawing Sheets

PIN FOR USE IN FABRIC STACKING AND PINNING TABLE

BACKGROUND OF THE INVENTION

This invention relates to the art of apparatus for performing operations such as cutting sheet material like cloth, and more particularly to a new and improved pin for use in apparatus for supporting and matching sheet material during such operations.

One area of use of the present invention is supporting or matching patterned sheet material in a stack for cutting a pattern from the stack, although the principles of the present invention can be variously applied. The matching of plaids, stripes, checked fabrics has been an expensive and difficult manual process for apparel manufacturers with stringent quality matching requirements. Problems can occur because the panels making up a garment must be correctly matched, and the pattern of each panel must be in the correct position in order for the whole garment to match perfectly. Furthermore, distortion in the fabric sometimes causes the size of the check or pattern to differ and stripes are not always straight.

One proposed solution to the foregoing is known in the art as a pin table having a supporting surface provided with a plurality of apertures therethrough arranged in closely spaced relation in a grid-like pattern on the supporting surface. The table includes holding and supporting means for receiving a plurality of pins at the ends opposite the sharp ends thereof and holding the pins substantially perpendicular to the supporting surface and locating the heads in registry with the apertures. In use, a pattern is placed on the supporting surface provided with the plurality of pins extending through apertures, the pins are lowered so that the heads are below the surface for removal of the pattern whereupon sheet material is placed so the surface, typically a plurality of plies being laid up in a stack, and simultaneously the pins are raised and moved through the sheet material to maintain alignment and matching of the plies in the stack. The pattern then is placed on the sheet material in a position determined by the location of the pins, the pins are lowered and the material is shaped such as by cutting.

One problem encountered with apparatus of the foregoing type is that a large stack of tightly woven fabric material can tend to grab or lock onto the pins extending therethrough as the apparatus operates to lower the pins as described hereinabove. Such grabbing or locking action by the fabric material can tend to pull the pins out of the holding and supporting apparatus thereby interfering with normal operation and resulting in unwanted delay in re-installing the pins.

Some pin tables of the foregoing type also include an arrangement for developing a positive pressure to apply a flotation force to sheet material on the surface to facilitate movement of the material along the surface. In particular, there is provided a manifold arrangement connected to a source of positive pressure, a plurality of openings in the supporting surface, a fluid sealing component for sealing the apertures while allowing pins to be moved therethrough, and conduits for connecting the manifold to the openings to supply positive pressure to the openings for applying a flotation force to sheet material on the surface. An example of the fluid sealing component is a sheet of rubber or like material extending along the lower and inner surface of the supporting surface in a manner blocking or covering the apertures to prevent fluid flow through the apertures. An important consideration in the foregoing arrangement is that during set-up when the pins are inserted in the apparatus by the operator, the pins do not punch permanent holes in the sheet of sealing material.

Thus, it would be highly desirable to provide a pin for the foregoing apparatus which is positively held in the holding and supporting means in a manner preventing unwanted withdrawal yet will not damage fluid sealing material associated with the pin receiving apertures in forms of the apparatus having flotation force capability. In addition, it would be highly desirable to provide such a pin which is sufficiently strong to resist bending when fabric or stacks thereof are pulled or otherwise moved along the table surface, and also to provide such a pin which facilitates fabric movement thereon.

SUMMARY OF THE INVENTION

It is, therefore, a primary objective of this invention to provide a new and improved pin for use in fabric stacking and pinning tables.

It is a further object of this invention to provide such a pin which is positively held in such tables against unwanted withdrawal, such as by grabbing or locking action of fabric during movement of the pin in the apparatus.

It is a further object of this invention to provide such a pin which does not leave permanent holes when inserted through a layer of fluid sealing material in such tables having flotation force capability.

It is a more particular object of this invention to provide such a pin which resists bending due to pulling or other movement of fabric along such table.

It is a more particular object of this invention to provide such a pin which facilitates removal of fabric therefrom.

It is a further object of this invention to provide such a pin which is simple in structure, easy and economical to manufacature, and efficient and effective in operation.

The present invention provides a pin for use in apparatus for supporting sheet material such as cloth during operations such as cutting performed thereon comprising a supporting frame, means on the frame defining a planar supporting surface adapted to receive plies of sheet material placed thereon, the surface having at least one through aperture therein and the surface having an outer portion contacting the material and an oppositely disposed portion, pin holding and supporting means carried by the frame and facing the oppositely disposed portion of the supporting surface, the holding and supporting surface adapted to receive a pin and maintaining the disposition of the pin substantially perpendicular to the plane of the surface and the location of the pin in registry with the aperture, and means carried by the frame for moving the holding and supporting means to move the pin through the aperture so that sheet material can be anchored on the pin, the pin comprising an elongated body having substantially constant cross sectional dimension along substantially the entire length of the body and terminating in a sharp pointed head at one end of the body and an enlargement at the opposite end of the body having a shape and cross-sectional size enabling the holding and supporting means to positively hold the pin and prevent unwanted withdrawl of the pin while at the same time allowing unimpeded movement of the pin and the enlargement through the aperture.

The enlargement is provided with an annular surface adjacent the portion of the pin body having substantially constant cross sectional dimension, the annular surface defining a shoulder adapted for engagement by pin contacting means in the pin holding and supporting means thereby preventing unwanted withdrawl of the pin from the holding and supporting means. The apparatus can include an arrangement for developing a positive pressure to apply a flotation force to sheet material on the surface to facilitate movement of the material therealong, the arrangement including a sheet of fluid impervious material extending along the lower or inner surface of the supporting surface in a manner preventing fluid flow through the apertures. The enlargement is provided with a pointed termination on the end thereof which is located on the pin body opposite the pointed head thereof, the pointed termination insuring that the pins do not punch permanent holes in the sheet of fluid impervious material during set-up of the apparatus. The pin is formed from metal having sufficient strength to resist binding by pulling of fabric or movement of fabric along the supporting surface, and the pin can be provided with a coating to enhance lubricity and facilitates fabric removal.

The foregoing and additional advantages and characterizing features of the present invention will become clearly apparent upon a reading of the ensuing detailed description together with the included drawing wherein:

DETAILED DESCRIPTION OF THE ILLUSTRATED EMBODIMENTS

Figures 1, 2:
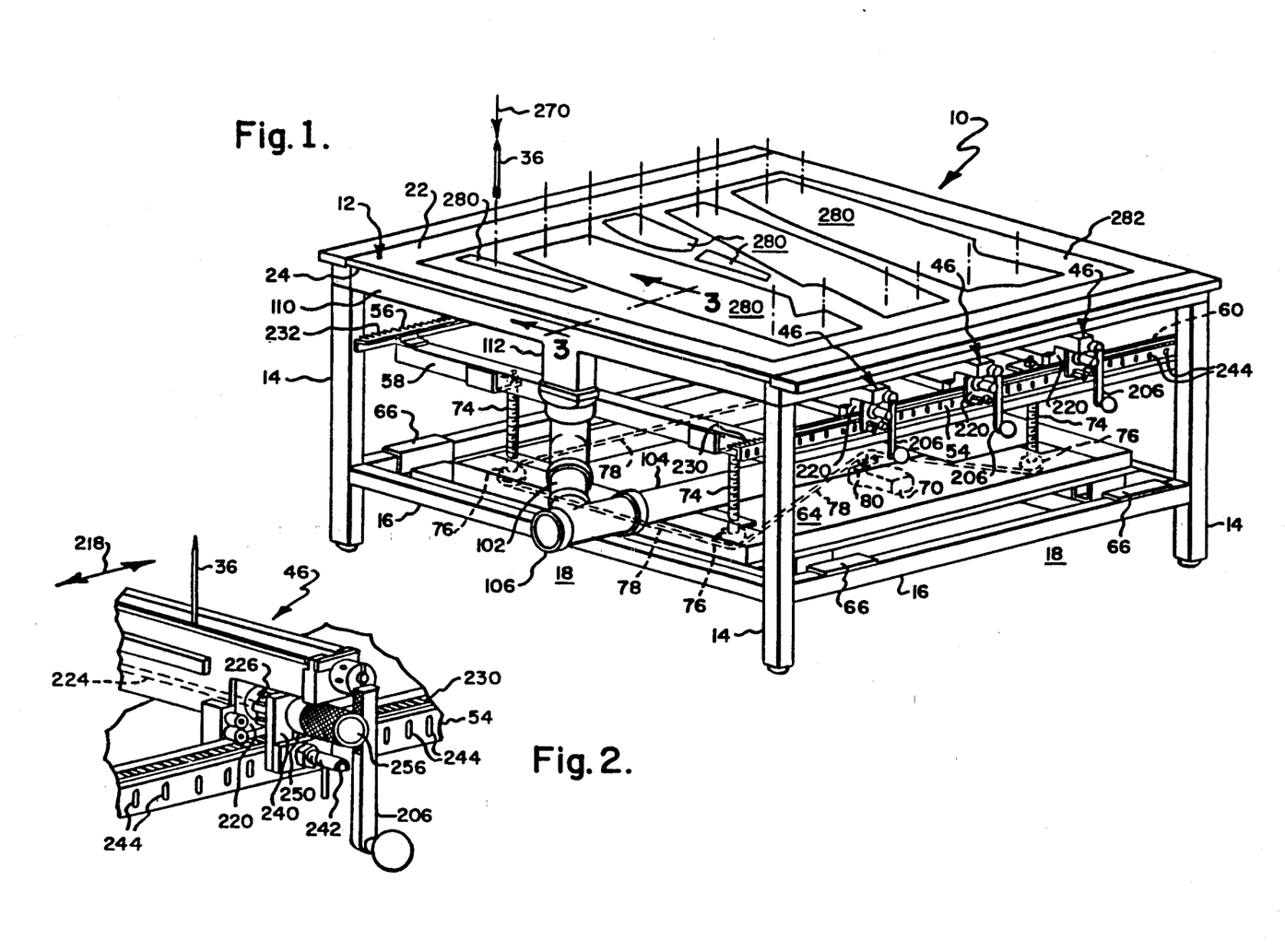
FIG. 1 is a perspective view of pin table apparatus including a pin according to the present invention.
FIG. 2 is a fragmentary enlarged perspective view of a portion of the apparatus of FIG. 1.

Referring now to FIG. 1, there is shown a fabric stacking and pinning a table generally designated 10 comprising a supporting frame and means on the frame defining a planar supporting surface 12 adapted to receive sheet material, such as cloth, placed thereon. A single pin table 10 is shown in FIG. 1 for convenience in illustration. If desired a plurality of tables 10 can be joined end-to-end to provide an elongated combined table of desired length. Table 10 comprises frame members including upstanding legs 14 at each corner joined by horizontal legs 16 whereby the table 10 is supported on a suitable surface such as a floor 18 as shown in FIG. 1.

Figures 3, 4, 5, 6:
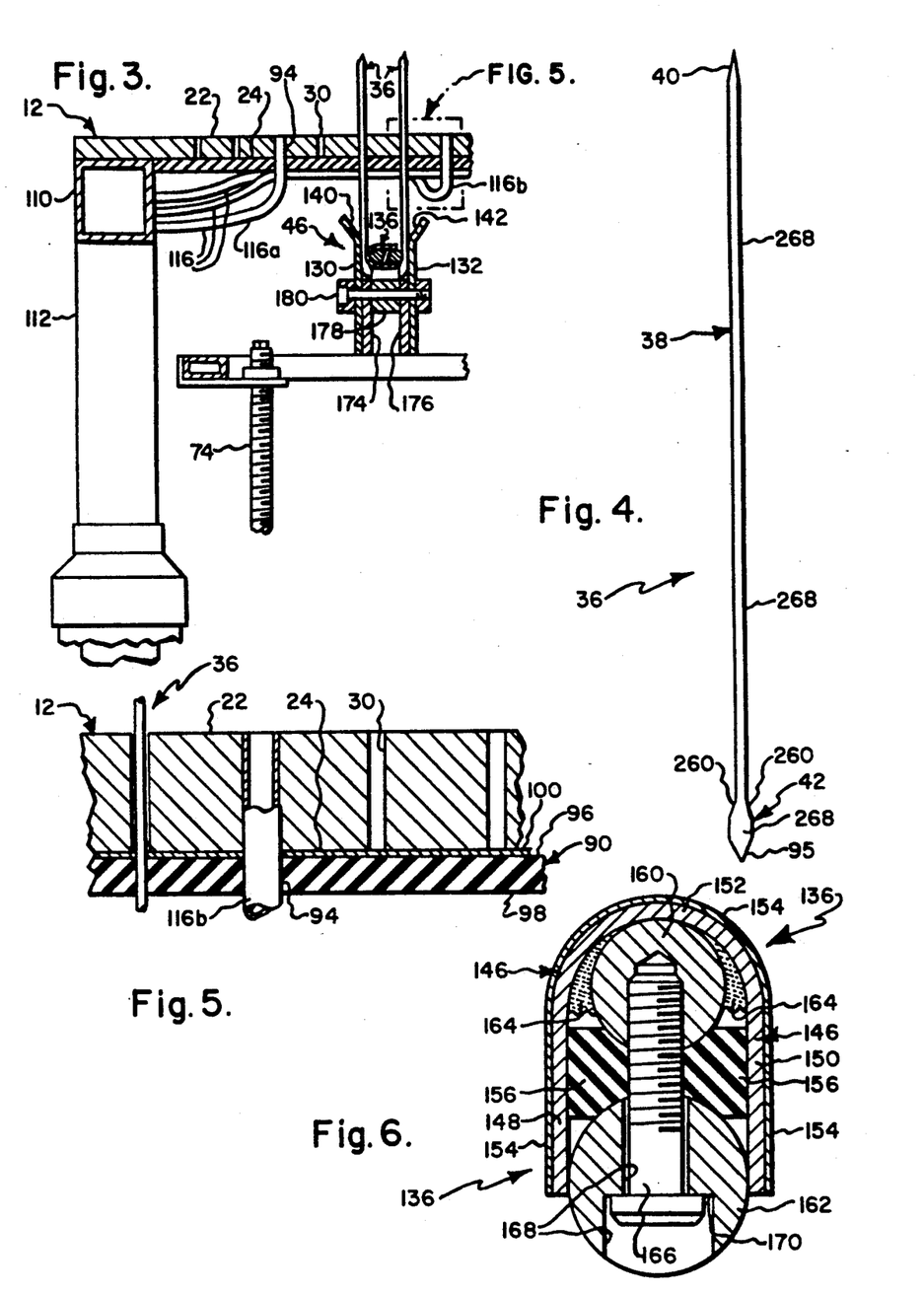
FIG. 3 is an enlarged sectional view taken about on lines 3—3 in FIG. 1 and further illustrating the pin of the present invention.
FIG. 4 is an enlarged, elevational view of a pin according to the present invention.
FIG. 5 is an enlarged elevational view taken about in the field designated by the broken lines in FIG. 3.
FIG. 6 is an enlarged cross-sectional view of the pin holding and supporting means shown in FIGS. 1-3.

The means 12 defining a planar supporting surface is in the form of a sheet of rigid material supported in the frame and disposed substantially parallel to the floor 18 or similar supporting surface on which the table 10 rests. Sheet 12 has an outer surface portion 22 for contacting the sheet material placed thereon and an oppositely disposed inner surface portion 24. As shown in FIG. 3 sheet 12 is provided with a plurality of through apertures or bores 30 which are arranged in closely spaced relation and in a grid-like pattern. The apertures 30 are for the purpose of receiving and guiding pins such as the pin according to the present invention designated 36 in FIGS. 1, 3 and 4, which pins are employed for matching of patterns in respective sheets of material and in relation to the pattern for shaping or cutting in a manner which will be described. As shown in FIG. 4, each pin 36, which will be described in further detail presently, comprises an elongated body 38 having a substantially constant cross-sectional dimension, i.e. diameter, along substantially the entire length of body 38 and terminating in a sharp, pointed head 40 at one end of body 38. Pin 36 further comprises an enlargement 42 at the opposite end of body 38 having a shape and cross-sectional size or dimension allowing unimpeded movement of pin body 38 and enlargement 42 through aperture 30 in a manner which will be described.

The apparatus of the present invention further comprises means carried by the frame for holding and supporting the afore-mentioned pins 36. The supporting means receives each pin 36 at the end including enlargement 42. The supporting means maintains the disposition of the pins 36 substantially perpendicular to the plane of sheet 12 and maintains the location of the pins in registry with the apertures 30. In addition, the holding means prevents unwanted withdrawl of pins 36 by engaging enlargement 42 in a manner holding each pin 36 against movement in a direction perpendicular to supporting surface 12 in a manner which will be described. As shown in FIG. 1, a plurality of pin holding and supporting means, each designated 46, are provided in spaced relation along table 10. Each holding and supporting means 46 extends transversely across and along substantially the entire width of table 10. Each can hold a plurality of pins 36 in a row extending across table 10. By virtue of this arrangement, pins of adjacent rows advantageously can be closely spaced together thereby achieving a one-inch grid pattern in an effective manner which will be described. The structure and operation of the individual pin holding and supporting means will be described in detail presently.

The apparatus of the present invention further comprises means for moving the plurality of holding and supporting means 46 to move the pins 36 carried thereby through the apertures 30 in sheet 12 between a position where the heads 40 of the pins are below the sheet outer surface 22 to a position where the heads of the pins are above surface 22 so that sheet material can be anchored on the pins. In particular, as shown in FIG. 1, the holding and supporting means 46 are supported in an auxiliary frame comprising a pair of spaced apart and parallel longitudinally extending frame sections 54,56 on which opposite ends of each holding and supporting means 46 rest. The ends of the holding and supporting means 46 are supported on frame sections 54, 56 in a manner permiting limited movement of each holding and supporting means 46 lengthwise along table 10 as will be described. The longitudinal frame sections are joined by a pair of laterally extending frame sections 58,60 located near opposite ends of table 10. A base generally designated 64 is fixed to the horizontal legs 16 of the table frame by means of brackets 66. There is provided drive means in the form of a drive motor 70 fixed to base 64 so as to be carried thereby and coupling means operatively connected to drive motor 70 and to means associated with frame sections 54, 56 for raising and lowering the pin holding and supporting means in response to operation of drive motor 70. In particular, there is provided a screw jack arrangement comprising four vertically disposed threaded screws 74 each threaded at one end to a coupling member on a corresponding frame section 54, 56 and each fixed near the opposite ends to sprockets 76, which, in turn, mesh with a continuous drive chain 78 operatively engaged by a gear 80 on the output shaft of motor 70. As a result, rotation of motor 70 in one direction raises the plurality of pin holding and supporting means 46 and rotation of motor 70 in the opposite direction lowers the pin holding and supporting means 46. A manually operated-control (not shown) is located on the table frame for convenient manipulation by persons using table 10 to control operation of motor 70.

The pin table 10 illustrated herein advantageously has the capability of applying a flotation force to sheet material on the surface thereof to facilitate movement of the material along the surface without the need for a large pressure chamber below the table surface. As previously described, the pin table top is in the form of a plate or sheet 12 which defines a planar supporting surface adapted to receive plies of sheet material placed thereon, and the surface has an outer portion 22 for contacting the material and an oppositely disposed inner portion 24. There is provided fluid sealing means 90 operatively associated with the pin table supporting surface for preventing fluid flow through the pin-receiving apertures 30 in a direction from the outer surface portion 22 to the oppositely disposed inner portion 24 while allowing the pins to extend therethrough, and means for applying positive pressure to the region or space between the outer surface portion 22 and the sheet material thereon. In particular, there is provided a plurality of openings or passages 94 extending through the table top surface and through the sealing means 90 and at spaced locations over the surface, and means on the pin table frame for supplying positive pressure to the openings 94 to apply a floatation force to sheet material on the table top surface to facilitate movement of the sheet material along the surface. The positive pressure in openings 94 is applied to the space between outer surface portion 22 and the sheet material thereon, and sealing means 90 prevents any loss of this positive pressure through the pin-receiving apertures 30.

Sealing means 90 preferably comprises a sheet of rubber or like material extending along the oppositely disposed surface portion 24 in a manner blocking or covering apertures 30 to prevent fluid flow through the apertures. In this connection, the objective is to prevent fluid flow through apertures 30 in a direction from supporting surface portion 22 to oppositely disposed surface portion 24. Furthermore, the material of sealing means 90 allows the pins to extend therethrough, and in particular to be manually pushed therethrough by the operator with little additional effort, while at the same time maintaining its fluid sealing capability. In particular, sealing means 90 maintains a fluid seal around a pin inserted therethrough, and it re-seals the area therein from which a pin is removed. This is facilitated or enhanced by the provision on each pin 36 of a sharp pointed termination 95 on the outer end of enlargement 42 which is at the end of pin body 38 opposite head 40.

This will be described in further detail presently. The sheet of material comprising sealing means 90 has a first surface portion 96 shown in FIG. 5 contacting surface portion 24 in sealing relation thereto and a second surface portion 98 which is exposed and faces in the opposite direction. Sealing means 90 is secured in place preferably by adhesive 100 extending over the entire contact area between surface portion 96 thereof and surface portion 25 of sheet 12. One form of material found to perform satisfactorily for sealing means 90 is an open cell from rubber material having a sealed outer skin and commercially available from Griswald Rubber Co., Moosup, Conn. under the designation Griswald Style #3120 blended open cell sponge, medium density, neoprene blend. One form of adhesive 100 found to perform satisfactorily is 3M General Purpose Adhesive 1357.

The means for supplying positive pressure to the region or space between outer surface 22 of table top 12 and sheet material placed thereon includes a source of positive pressure in the form of a compressor/air blower (not shown) which can be mounted with the pin table or, alternatively, and as shown in FIG. 1, a single source or compressor/air blower can be provided for supplying positive pressure through a network of branch conduits to a plurality of pin table sections arranged in end-to-end relation. As shown in FIG. 1, table 10 is provided with a pair of branch conduits 102, 104 for supplying pressure to opposite ends of table 10 for a purpose to be described which meet in a single conduit section 106 for connection either directly to a compressor/air blower or to a conduit of the aforesaid network.

The means for connecting the output of the positive pressure source to the region or space between outer surface 22 of the table top and material placed thereon includes manifold means associated with the pin table frame, means for connecting the output of the source to the manifold means, and conduit means connected to the manifold means and to each of the openings 94. In a preferred arrangement, a pair of manifolds is provided, one at each end of pin table 10, and a pair of supply ducts or pipes connect the output of the source to the manifolds. One of the manifolds is shown in FIGS. 1 and 3 and is generally T-shaped having an elongated hollow rectangular body 110 which extends along a major portion of the upper end of table 10 and is defined by a section of the pin table frame. The manifold body 110 is located along the underside of table top 12 and terminates at each end adjacent the upper ends of two of the vertical frame members of legs 14. An inlet tube 112 extends from the central portion of body 110 for connection to one of the supply pipes, i.e. branch conduit 102.

The conduit means comprises a plurality of tubes 116 shown in FIG. 3, preferably of flexible material, each fitted at one end into an opening in a wall of manifold body 110 and fitted at the other end into one of the openings 94. The tubes 116 are arranged in groups corresponding to rows of the openings 94 and can be bundled together by appropriate ties or brackets holding the groups close to or in contact with the underside of table top 12. Similarly, the openings in the wall of manifold body 110 are arranged in corresponding groups. Tubes 116 preferably are of plastic material, preferably soft polyurethane material because of its sealing properties. The ends of two tubes 116a and 116b are shown in FIG. 3 and extend along the entire lengths of openings 94 and terminate at the outer surface 22 of table top 12.

The arrangement illustrated in FIGS. 1 and 3 occupies one-half of the table top 12 being located on the underside thereof. An identical arrangement of manifold openings and tubes is provided on the other half of table top 12, being located on the underside thereof.

As previously described, a plurality of pin holding and supporting means 46 are in spaced relation along the length of table 10, and each holding and supporting means 46 extends transversely across substantially the entire width of table 10 for holding a plurality of pins 36 in a row extending across table 10. In the illustrated arrangement, each holding and supporting means 46 holds two rows of pins as shown in FIG. 3, and the spacing between the two rows of pins in each holding and supporting means 46 is equal to the minimum spacing between adjacent rows of pins 36 of adjacent pin holding and supporting means 46.

By virtue of the foregoing arrangement of separate pin holding and supporting means 46, pins 36 of adjacent rows can be closely spaced together thereby achieving a grid pattern wherein the pins are relatively closely spaced. This, in turn, optimzies matching the grid pattern of pins to plaid pattern fabrics of any size plaid. The illustrated arrangement, wherein each individual pin holding and supporting means is of relatively narrow width, enables a one-inch grid pattern to be achieved. A one-inch grid pattern of pins 36 assures that the pins 36 will reach the match points of the plaids, and with such a pattern the plaid fabric can be moved one-half inch in either direction and the match points still will reach the pins 36. In the particular arrangement illustrated herein, the two rows of pins 36 in each holding and supporting means 46 are spaced one inch apart, and each of the rows, in turn, will be spaced one inch from the adjacent row of pins 36 on an adjacent holding and supporting means 46 when the two are in abutting relation.

Each holding and supporting means 46 includes an elongated housing including a pair of sidewalls 130, 132 which define an open top and a pin contacting means 136 between the sidewalls and movable between a first position wherein pins 36 are loosely held between the contacting means 136 and corresponding one or both of the sidewalls 130, 132 and a second position wherein the pins 36 are tightly held or clamped between the pin contacting means 136 and the corresponding sidewalls and wherein the pins 36 are positively held by engagement or contact between pin contacting means 136 and each pin enlargement 42 in a manner which will be described. Sidewalls 130 and 132 have outwardly diverging ends 140 and 142, respectively, as shown in FIG. 3 to facilitate entry or insertion of pins between the sidewall and pin contacting means 136.

Each pin contacting means 136 is elongated and journalled at opposite ends for pivotal movement about an axis parallel to the longitudinal axis of the holding and supporting means 46. As shown in FIGS. 3 and 6, each pin contacting means 136 includes an elongated housing 146 of U-shaped cross-section including spaced-apart sidewalls 148, 150 joined by a curved central web section 152. The outer surface of housing 146 is provided with a strength enhancing coating 154 of chrome or like material. An elongated strip or bar 156 of rubber or like resilient material is located within housing 146 and contacts the facing inner surfaces of sidewalls 148, 150. A pair of rods 160, 162 are fitted in corresponding open regions extending along the assembly defined by the opposite side surfaces of strip 156 and the inwardly facing surface portions of housing 146. One of the rods, for example rod 160, is of smaller diameter and fixed to housing 146 such as by welds 164. The other of the rods, for example rod 162, has a diameter substantially equal to the distance between the inner surfaces of sidewalls 148, 150 and is movably held in the assembly so as to be slidable within housing 146 in a direction substantially perpendicular to the longitudinal axis thereof for a purpose to be described. In this connection, a plurality of screws 166 are secured in rod 160 at axial locations there along and extend loosely through transverse bores 168 in rod 162 with the screw heads engaging shoulders 170 defined in the bores to hold rod 162 in the assembly and to limit the extent of movement of rod 162. The spacing between sidewalls 130, 132 is maintained by a pair of internal plates 174, 176 contacting the inner surfaces of sidewalls 130, 132 and a series of spacers 178 between the plates 174 and 176 held in place by bolt and nut type fasteners.

The fixed rod, i.e. rod 160, has a length greater than that of the overall assembly thereby providing extending ends (not shown) which are fixedly mounted in corresponding recessed blocks (not shown). One block has a short shaft portion (not shown) which is rotatably connected in an upwardly extending supporting frame portion (not shown). The other block has a relatively long shaft portion (not shown) which is mounted in the body of a handle 204 having a grip 206 shown in FIG. 2. Pivoting of handle 204 moves the pin contacting means 136 between pin locking and pin releasing positions as will be described. For a more detailed description of the foregoing arrangement reference may be made to U.S. Pat. No. 5,090,669 issued Feb. 25, 1992 entitled "Pin Table" assigned to the assignee of the present invention, the disclosure of which is hereby incorporated by reference.

There is provided means for mounting the pin holding and supporting means 46 each for a limited amount of bi-directional movement along the longitudinal axis of pin table 10, i.e. in the direction of arrow 218 in FIG. 2. Each pin holding and supporting means 46 includes a pair of depending end walls, one designated 220 in FIGS. 1 and 2, provided with aligned apertures (not shown), respectively, through which a shaft 224 extends so as to be rotatably mounted therein. Shaft 224 is parallel to the longitudinal axis of the pin supporting and holding means 46 of which it is a part. The axis of shaft 224 is parallel to the axis of rods 160 and 162. First and second pinions, one designated 226 in FIG. 2, are fixed to shaft 224 adjacent opposite ends thereof and mesh with corresponding first and second racks 230 and 232, respectively, which extend parallel to the longitudinal axis of pin table 10 and are mounted on frame members 54 and 56, respectively. Thus, the arrangement of shaft 224, the pinions and the racks 230, 232 allows limited movement of each pin holding and supporting means 46 in both longitudinal directions along pin table 10, i.e. toward and away from each neighboring and adjacent pin supporting and holding means 46. Accordingly, the distance between pins of adjacent pin holding and supporting means, and thus the spacing of the grid pattern, can be adjusted. The narrow width profile of each of the pin supporting and holding means 46 enables a relatively closely spaced grid pattern, i.e. as small as one inch, to be established. Furthermore, each pin holding and supporting means 46 is releasably locked at selected spaced locations along table 10 by an arrangement including a depending end member or flange 240, the lower end of which contacts the outer surface of frame 54 and is provided with a spring-biased plunger 242 which selectively locks in spaced apertures 244 and in frame 54 extending along the length of table 10.

End member 240 is provided with a central vertical slot 250 to accommodate an extension (not shown) of shaft 224 which projects outwardly beyond end member 240 to receive a handle locking member or sleeve 256 having a cylindrical outer wall and an end wall facing end number 240. Shaft 224 is rotatably received in an aperture in the end wall of locking sleeve 256 offset from the longitudinal axis of the sleeve so as to provide an eccentric mounting of locking sleeve 256 on shaft 224. Locking sleeve 256 is slidable on shaft 224 between axial limits established by a washer (not shown) fixed by a screw (not shown) to the end of shaft 224 and by the outer surface of end member 240. Handle 206 is locked by the position of locking sleeve 256 shown in FIG. 2, this being enhanced by frictional engagement between a knurled edge of handle 206 and the knurled outer surface of locking sleeve 256. When it is desired to move the handle 206 to the unclamped position of the pin contacting means 136, locking sleeve 256 is moved by hand axially inwardly of the position shown in FIG. 2 toward member 240 until it no longer contacts handle 206 whereby handle 206 is movable to the unlocked position of pin contacting means 136. The foregoing arrangement for releasably locking pin contacting means 136 is similar in structure and operation to that shown and described in the aforementioned U.S. Pat. No. 5,090,669.

As shown in FIG. 4, enlargement 42 meets the constant diameter portion of pin body 38 in a circumferential or annular surface 260 which, in co-operation with the adjacent surface of portion 38 defines an annular shoulder-like formation which is engaged or contacted by the curved central web section 152 of pin contacting means during the locked position shown in FIG. 3. This provides the positive locking action previously described so as to prevent unwanted pulling of pins 36 from the holding and supporting means 46. Such unwanted withdrawal could occur with prior art pins when in effect grabbed by a stack of tightly woven fabrics on table 10 and when the holding means 40 is lowered. The pointed end 95 on enlargement 42 ensures that each pin when inserted through aperture 40 and the rubber sheet 90 will not leave a hole in sheet 90. In other words, the pin 36 must be positively and effectively held in holding and supporting means 46 yet not punch a hole in sheet 90 when inserted therethrough. In addition, the pin must be sufficiently stiff as not to be bent when the fabrics are pulled which would otherwise shift the grid arrangement.

By way of example, an illustrative pin 36 is made from straight and tempered carbon steel music wire QQ-W-40/ASTM A228. The pin can be provided with a nickel coating 268 to enhance lubricity thereby reducing the grabbing effect from a stack of fabric. In an illustrative pin 36 the overall length is 7.30 inch, the axial length of head 40 is 0.187 inch, the surface defining head 40 is disposed at an angle of 7.5° to the longitudinal axis of pin 36, body portion 38 has a diameter of about 0.063 inch, enlargement 42 has an axial length of 0.50 inch from the end of the constant diameter portion of body 38 to the tip of formation 95, surface 260 has an axial length of 0.10 inch and defines an angle of 8° with the longitudinal axis of pin 36, termination 95 has an axial length of 0.17 inch and has a surface defining an angle 15° to the longitudinal axis of pin 36, and the portion of enlargement 42 between surface 260 and termination 95 has a diameter of 0.080–0.085 inch.

In forming pin 36, a length of wire is cut to appropriate length, which in case of the foregoing example is 7.50 inch, tip 40 is machined on one end and a small chamfer is provided on the opposite end. A forging die is provided having a cavity shaped to define enlargement 42. The wire is clamped in the die with the chamfered end in the cavity, and then heat is applied to the end of the wire in the cavity thereby forming the enlargement. Each pin after forgoing can be plated with a coating 268 of nickel to enhance lubricity and promote fabric movement on the pin. The coating also resists corrosion of the pin.

The pin table 10 of the present invention is used in the following manner for supporting and matching patterned sheet material during shaping operations such as cutting. First, a pattern is placed on surface 12. For example, when cutting operations are to be performed on the sheet material, the pattern provides the outline around which the pieces or part are to be cut. The pin holding and supporting means 46 are positioned or spaced relative to each other, i.e. moved toward or away from each other along table 10, according to the requirements of the pattern and the cutting operation. Matching scales (not shown) on the table top 12 and the frame supporting the pin holding means 46 aid in aligning the individual means 46 with the apertures 30. The next step comprises inserting pins 36 into apertures 30, the number and arrangement of pins 36 being determined by the pattern. The pins are inserted manually through the pattern in the direction as shown by arrow 270 in FIG. 1, the ends including enlargement 42 and sharp termination 95 being received in the pin holding and supporting means 46 as shown in FIG. 3 and the sharp end or heads 40 of the pins being located outwardly of, i.e. above, surface 12. The pins are maintained in this arrangement or pattern during subsequent steps in the operation. As previously described, during this procedure the sharp termination 95 prevents formation of holes in the rubber strip which might otherwise occur with blunt ended pins.

In particular, during manual insertion of pins 36, the pin contacting means 136 is in a pin receiving position wherein the pins 36 can be readily manually inserted between the outer surface of pin contacting means 136 and the inner surfaces of sidewalls 130, 132 as seen in FIG. 3. In this first position of pin contacting means 136, which would be rotated about 45° about the longitudinal axis thereof in a clockwise direction as viewed in FIG. 3, the pins 36 are realeasably held in the pin holding and supporting means 46. After the pins 36 are inserted in the holding and supporting means 46, the pins 36 are firmly clamped in the holding and supporting means. In particular, handle 206 is manually operated to pivot pin contacting means 136 about its longitudinal axis in a first direction, i.e. counter-clockwise as viewed in FIG. 3, to a position where end surface 152 and the laterally opposite outer exposed surface of rod 162 bear tightly against pins 36 and the inner surfaces of the corresponding sidewalls 130 and 132. In this position, the afore-mentioned surface of pin contacting means 136 engages or contacts the annular shoulder adjacent pin annular surface 260. During this clamping operation, rod 162 is forced inwardly against the resiliency of strip 156, the rod, being mounted for limited sliding movement within housing 150. In this connection, rod 162 fits snuggly but movably within housing 150, its inward movement is limited by strip 156 and its outward movement is limited by the heads of screws 166 engaging shoulder 170. When it is desired to unclamp pins 36 so that they can be removed manually from the pin holding and supporting means 46, handle 206 is manually operated to pivot pin contacting means 136 about its longitudinal axis in a second, opposite direction, i.e., clockwise as viewed in FIG. 3, to a position angularly displaced from that shown in FIG. 3 wherein the pins 226 are releasably held in the supporting and contacting means 46. In this position, end surface 152 and the outer surface of rod 162 bear loosely against pins 36 and the inner surfaces of sidewalls 130, 132.

The foregoing operation occurs for each pin holding and supporting means 46. In this connection, two rows of pins 36 can be inserted in each holding and supporting means 46, this being determined by the nature of the pattern being shaped. Next, the pins 36 are moved vertically downwardly as viewed in FIGS. 1 and 3 by moving the supporting frame 54, 56, 58 as previously described. During such movement the pins 36 are maintained in the arrangement. This is ensured by the aforementioned contact or engagement between the surfaces of the pin contacting means 136 and the annular shoulder defined adjacent pin surface 260. Such movement of pins 36 places the sharp ends thereof at or below the surface 12 whereupon the pattern is removed.

The next step in the operation is placing sheet material on surface 12 while moving pins 36 through the sheet material to maintain positioning of the sheet material on surface 12. Pins 36 are moved upwardly vertically relative to surface 12. Typically the step comprises laying up a plurality of plies of sheet material on the surface 12 to provide a stack while moving pins 36 progressively upwardly through the stack to maintain alignment and matching of the plies in the stack. Upon completion of placing sheet material on the surface 12, the pattern is placed on the sheet material in a position determined by the location of pins 36, i.e., the pattern is placed on the exposed sharp ends or heads of pins 36.

If desired, a shaping operation such as cutting can be performed with pins 36 remaining in the stack of sheet material, the cutting being guided by the pattern. Typically, pins 36 are moved downwardly vertically through the sheet material to locate the pin heads at or below surface 12. Next, the sheet material is shaped, for example cut by a straight knife machine commercially available from Eastman Machine Company under the designation Blue Streak, by following the pattern. This results in stacks of cut parts or pieces designated 260 in FIG. 1 which can be removed from surface 12. Such removal can be enhanced by applying a positive pressure to the region below the stacks to apply a flotation force in a manner which will be described. Upon the conclusion of the foregoing, the pins are moved upwardly through the apertures 20, the pins are released by moving pin contacting means 136 as previously described, and then the pins are wihdrawn therefrom by hand to prepare the table 10 for the next operation.

When it is desired to apply a flotation force to material on table top 12 to facilitate movement therealong, the operator manually actuates a suitable control such as a valve (not shown) to allow positive pressure fluid such as compressed air to flow from the source through pipes 102 and 104 and into the manifolds such as manifold 110 shown in FIGS. 1 and 3 from which the positive pressure fluid is distributed by tubes 116 to the openings 94 and thus between the outer surface 22 of table top 12 and sheet material 280 placed thereon, typically in a stack. This facilitates movement of the material along the surface of table top 12 by the operator. The sealing means 90 prevents loss of the positive pressure fluid through the apertures 30. The integrity of sealing means 90 is maintained as previously described by virtue of the pointed end 95 on each pin enlargement 42 which ensures that holes are not formed in sheet 90 when pins 36 are manually inserted therethrough during the initial set up of pin table 10 prior to an operation. Typically, a sheet 282 of non-permeable material such as paper or the like is inserted between the stacks 270 and the outer surface of table top 12 to prevent loss of positive pressure fluid in an upward direction through the stack.

By way of example, in an illustrative pin table wherein top 12 is about 96 inches long by about 60 inches wide, openings 30 are arranged in a one-inch grid pattern and openings 94 are arranged in an eight-inch grid pattern. Table top 12 is of particle board or flake board material having a thickness of about one inch and is provided with an outer layer of Formica or like material defining surface portion 22. Rubber sheet 90 has a thickness of about one-quarter inch. Each tube 116 has an outer diameter of about 6 mm and an inner diameter of about 4 mm. Pipes 102, 104, 106 are of about four-inch diameter, and the air blower operates at 4 psig in a lower pressure, high volume mode. With the impervious sheet 262 placed between stacks 260 and table top 12 as previously described, the apparatus has the capability of lifting cloth sheet goods having a weight in excess of 120 pounds measured over an area of 40 square feet.

It is therefore apparent that the present invention accomplishes its intended objects. In particular, there is provided a new and improved pin for use in apparatus for supporting and matching patterned sheet material such as cloth in a stack during operations thereon such as cutting. Enlargement 42 including shoulder defined by surface 260 ensures that the pin is positively held in the holding and supporting means 46 when the pins are lowered during operation of the apparatus and there is a tendency for the fabric to grab or lock onto the pins. The pointed termination 95 on the end of enlargement 42 ensures that each pin when inserted through an aperture 40 and the rubber sheet 90 will not leave a hole in sheet 90. The metal selected for pin 36 resists bending due to fabric pulling or movement along the table surface. The nickel coating 268 on the pin promotes fabric slippage thereon. The coating also prevents corrosion. The foregoing is achieved by a pin structure which is relatively simple, easy and economical to manufacture and efficient and effective in operation.

While an embodiment of the present invention as been described in detail, that is for the purpose of illustration, not limitation.

What is claimed is:

1. A pin in combination with an apparatus for supporting sheet material such as cloth during operations such as cutting performed thereon comprising a supporting frame, means on said frame defining a planar supporting surface adapted to receive plies of sheet material placed thereon, said surface having at least one through aperture therein of substantially circular shape, said surface having an outer portion contacting said material and an oppositely disposed portion, pin holding and supporting means carried by said frame and facing said oppositely disposed portion of said supporting surface, said holding and supporting means adapted to receive a pin and maintain the disposition of the pin substantially perpendicular to the plane of said surface and the location of the pin in registry with said aperture, and means carried by said frame for moving said holding and supporting means to move the pin through said aperture so that sheet material can be anchored on the pin, said pin comprising:
  a) an elongated body of substantially circular cross-section and having a substantially constant cross-sectional dimension along substantially the entire length of said body and terminating in a sharp, pointed head at one end of said body; and
  b) an enlargement immediately at the opposite end of said body having a shape and cross-sectional size enabling said holding and supporting means to positively hold said pin and prevent unwanted withdrawl of said pin while at the same time allowing unimpeded movement of said pin and said enlargement through said aperture, said enlargement being of substantially circular cross-section having a diameter larger than the diameter of said body.

2. A pin according to claim 1, wherein said enlargement is provided with an annular substantially conical surface adjacent the portion of said body having substantially constant cross-sectional dimension, said annular surface defining a shoulder adapted for engagement by pin contacting means of said holding and supporting means thereby preventing unwanted withdrawal of said pin from said holding and supporting means.

3. A pin according to claim 1, wherein said enlargement is provided with a pointed termination on the end thereof which is located on said pin body opposite the pointed head thereof.

4. A pin according to claim 1, wherein said pin body and said enlargement are integral and formed from metal having sufficient strength to resist bending by pulling of fabric or movement of fabric along the supporting surface of said apparatus.

5. A pin according to claim 1, wherein said pin body and said enlargement are of metal plated with a coating to enhance lubricity and promote fabric slippage.

6. A pin according to claim 5, wherein said coating is of nickel.

7. Apparatus for supporting sheet material such as cloth during operations such as cutting performed thereon comprising:
  a) a supporting frame;
  b) means on said frame defining a planar supporting surface adapted to receive plies of sheet material placed thereon, said surface having a plurality of through apertures therein of substantially circular shape and arranged in a pattern on said surface, said surface having an outer portion contacting said material and an oppositely disposed portion;
  c) a plurality of pins each disposed substantially perpendicular to the plane of said surface and each located in registry with one of said apertures, each of said pins having a sharp head at one end and an enlargement at an opposite end, each of said pins having a body which is elongated and of substantially circular cross-section;
  d) a plurality of separate pin holding and supporting means carried by said frame and arranged in rows therealong and facing said oppositely disposed portion of said supporting surface, each of said pin holding and supporting means being of relatively narrow width and having a length extending transversely of said supporting surface and said plurality of holding and supporting means being in closely spaced relation extending longitudinally of said supporting surface, said holding and supporting means receiving said pins at said opposite ends thereof and maintaining the disposition of said pins substantially perpendicular to the plane of said surface and the location of said pins in registry with said apertures, each of said pin holding and supporting means including a pair of sidewalls in spaced relation extending along said length and having oppositely facing inner surfaces and defining a trough-like region open toward said portion of said supporting surface;
  e) each of said pin holding and supporting means including pin contacting means movable about an axis substantially parallel to said length between a first position wherein pins are releasably held in said pin holding and supporting means to a second position wherein said pins are firmly clamped in said pin holding and supporting means betwen said inner facing surfaces of said sidewalls and corresponding opposite surfaces of said pin contacting means, said surfaces of said pin contacting means engaging said enlargements in a manner holding said pins against movement in a direction perpendicular to said supporting surface; and
  f) means carried by said frame for moving said holding and supporting means to move said pins through said apertures inwardly between a position where the heads of said pins are spaced inwardly from said outer surface portion and a position where said pins extend through said apertures and the heads of said pins are spaced outwardly from said outer surface portion so that said sheet material can be anchored on said pins;
  g) said enlargement being of a shape and size allowing unimpeded movement of said pins and said enlargements through said apertures, said enlargement being of substantially circular cross-section having a diameter larger than the diameter of said body.

8. Apparatus according to claim 7, wherein said enlargement is provided with an annular substantially conical surface adjacent the portion of said pin body having substantially constant cross sectional dimension, said annular surface defining a shoulder adapted for engagement by said pin contacting means thereby preventing unwanted withdrawl of said pin from said holding and supporting means.

9. Apparatus according to claim 7, wherein said enlargement is provided with a pointed termination on the end thereof which is located on said pin opposite the pointed head thereof.

10. Apparatus according to claim 7, wherein said pin is formed from metal having sufficient strength to resist bending by pulling of fabric or movement of fabric along the supporting surface of said table.

11. Apparatus according to claim 7, wherein said pin is of metal plated with a coating to enhance lubricity and promote fabric slippage.

12. Apparatus according to claim 11, wherein said coating is of nickel.

13. Apparatus according to claim 7, wherein said apparatus further includes an arrangement for developing a positive pressure to apply a flotation force to sheet material on said supporting surface to facilitate movement of the material therealong, said arrangement including a sheet of fluid impervious material extending along the inner portion of said supporting surface in a manner preventing fluid flow through said apertures, and wherein said pin enlargement is provided with a pointed termination on the end thereof which is located on said pin body opposite said pointed head thereof, said pointed termination insuring that said pin does not punch a permanent hole in said sheet of fluid impervious material during set-up of said apparatus.

14. A pin in combination with an apparatus for supporting sheet material such as cloth during operations such as cutting performed thereon comprising a supporting frame, means on said frame defining a planar supporting surface adapted to receive plies of sheet material placed thereon, said surface having at least one through aperture therein, of substantially circular shape said surface having an outer portion contacting said material and an oppositely disposed portion, pin holding and supporting means carried by said frame and facing said oppositely disposed portion of said supporting surface, said holding and supporting means adapted to receive a pin and maintain the disposition of the pin substantially perpendicular to the plane of said surface and the location of the pin in registry with said aperture, and means carried by said frame for moving said holding and supporting means to move the pin through said aperture so that sheet material can be anchored on the pin, said pin comprising:

a) an elongated body of substantially circular cross-section having a substantially constant diameter along substantially the entire length of said body and terminating in a sharp, pointed head at one end of said body; and    b) an enlargement at the opposite end of said body having a shape and cross-sectional size enabling said holding and supporting means to positively hold said pin and prevent unwanted withdrawl of said pin while at the same time allowing unimpeded movement of said pin and said enlargement through said aperture, said enlargement being of substantially circular cross-section and having a diameter larger than the diameter of said body along a major portion of the length of said enlargement, said enlargement having a pointed termination on the end thereof which is located on said pin body opposite the pointed head thereof, and said enlargement having an annular surface adjacent the portion of said pin body having substantially constant diameter, said annular surface defining a shoulder adapted for engagement by pin contacting means thereby preventing unwanted withdrawl of said pin from said holding and supporting means.

15. A pin according to claim 14, wherein said pin body and said enlargement are of metal having sufficient strength to resist bending by pulling of fabric or movement of fabric along the supporting surface of said aperture.

16. A pin according to claim 14, wherein said pin body and said enlargement are of metal plated with a coating to enhance lubricity and promote fabric slippage.

17. A pin in combination with an apparatus for supporting sheet material such as cloth during operations such as cutting performed thereon comprising a supporting frame, means on said frame defining a planar supporting surface adapted to receive plies of sheet material placed thereon, said surface having at least one through aperture therein of substantially circular shape, said surface having an outer portion contacting said material and an oppositely disposed portion, pin holding and supporting means carried by said frame and facing said oppositely disposed portion of said supporting surface, said holding and supporting means adapted to receive a pin and maintain the disposition of the pin substantially perpendicular to the plane of said surface and the location of the pin in registry with said aperture, means carried by said frame for moving said holding and supporting means to move the pin through said aperture so that sheet material can be anchored on the pin, and an arrangement for developing a positive pressure to apply a flotation force to sheet material therealong, said arrangement including a sheet of fluid impervious material extending along the inner portion of said supporting surface in a manner preventing fluid flow through said aperture, said pin comprising:

a) an elongated body of substantially circular cross-section and having a substantially constant cross-sectional dimension along substantially the entire length of said body and terminating in a sharp, pointed head at one end of said body; and    b) an enlargement immediately at the opposite end of said body having a shape and cross-sectional size enabling said holding and supporting means to positively hold said pin and prevent unwanted withdrawl of said pin while at the same time allowing unimpeded movement of said pin and said enlargement through said aperture, said enlargement being of substantially circular cross-section and having a diameter larger than the diameter of said body, said enlargement being provided with an annular substantially conical surface adjacent the portion of said body having substantially constant cross-sectional dimension, said annular surface defining a shoulder adapted for engagement by pin contacting means of said holding and supporting means thereby preventing unwanted withdrawal of said pin from said holding and supporting means, said pin enlargement being provided with a pointed termination on the end thereof which is located on said pin body opposite said pointed head thereof, said pointed termination insuring that said pin does not punch a permanent hole in said sheet of fluid impervious material during set-up of said apparatus.

* * * * *